P. DANCKWARDT.
POWER PRODUCING PROCESS.
APPLICATION FILED APR. 14, 1908.
933,023.
Patented Aug. 31, 1909.
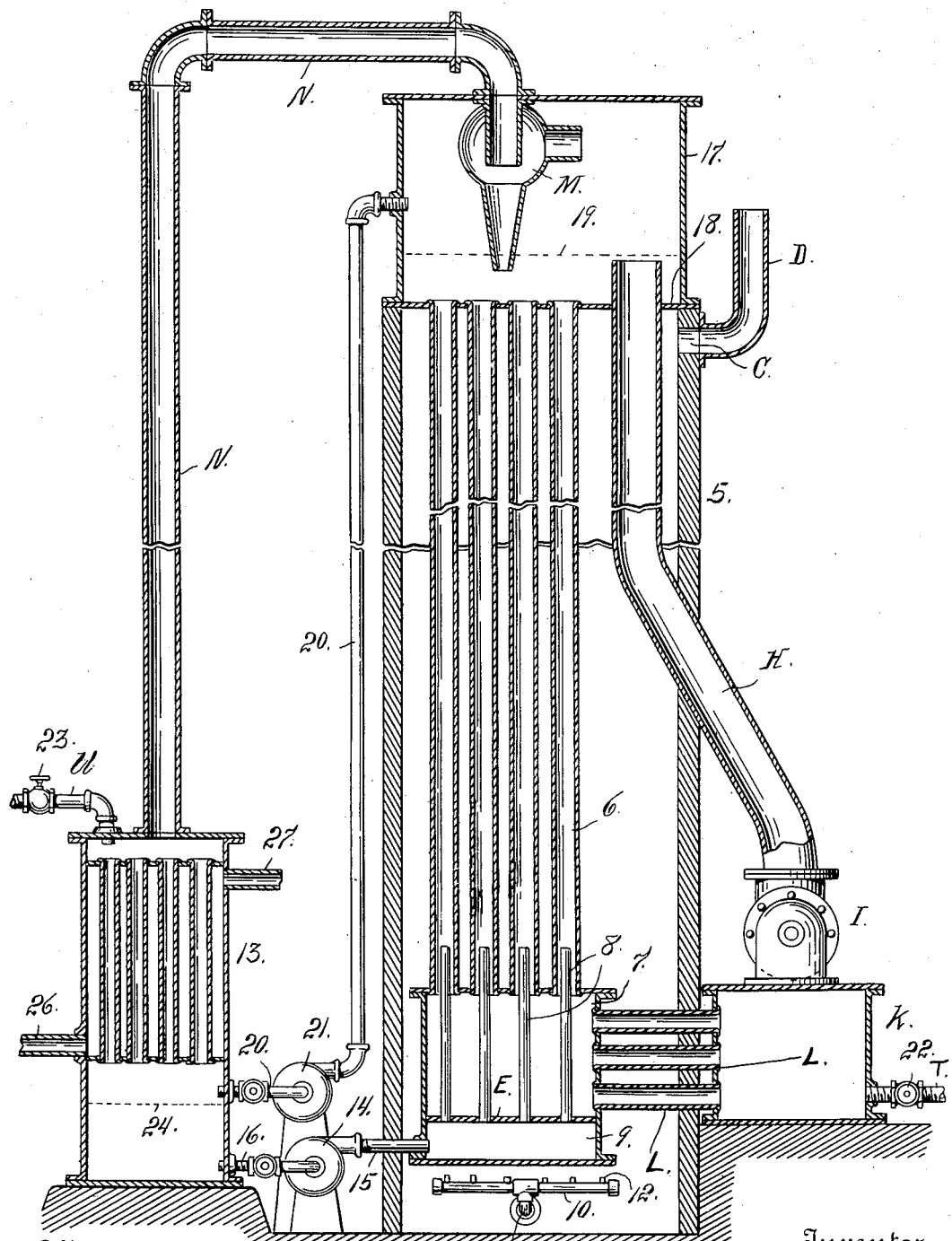
Witnesses
Otto E. Hoddick
J. D. Thornburgh
Inventor
P. Danckwardt
Attorney

UNITED STATES PATENT OFFICE.

PAUL DANCKWARDT, OF DENVER, COLORADO.

POWER-PRODUCING PROCESS.

933,023.

Specification of Letters Patent. Patented Aug. 31, 1909.

Application filed April 14, 1908. Serial No. 426,978.

*To all whom it may concern:*

Be it known that I, PAUL DANCKWARDT, a citizen of the United States, residing in the city and county of Denver and State of Colorado, have invented a certain new and useful Power-Producing Process; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
This invention relates to a new and useful process for producing power from fuel or the heat of waste gases, exhaust steam, etc., by causing a body of heated fluid to be set into motion by a current of gas, this gas being generated by the heat of the moving fluid upon another fluid substance which has a boiling point or point of volatilization, below that of the moving fluid and a very low latent and specific heat, and which is continuously condensed and reintroduced as a fluid, the moving fluid before returning to its starting place passing a turbine or other suitable motor and thus transforming the velocity of its mass into power.
While any suitable apparatus may be employed in practicing my process, I have illustrated in the accompanying drawing one form of apparatus that may be employed.

In this drawing, let the numeral 5 designate a chimney-like structure built of any material for instance brick, cement or iron, preferably covered with an outside packing to prevent loss of heat by radiation. At the bottom is an opening through which a pipe B passes for the introduction of the heating gases to a pipe 10 which as shown in the drawing is provided with upwardly directed nozzles 12. The heating agent may consist of waste gases, exhaust steam or direct combustion gases. Near the top of the structure 5 is a port C communicating with a pipe D for the escaping gases. The top of the structure 5 is closed by a pan-like vessel 17. Inside of the structure 5 is placed the apparatus in which the circulation of the water or other fluid is produced. It consists of an iron box 7 provided with an extra bottom or partition E from which small pipes 8 extend upwardly through the top plate of the box into corresponding larger pipes 6. The latter extend through the bottom plate 18 of the vessel 17 and open into the latter. The upper extremities of these pipes are open and are tightly fitted into the plate 18. The top vessel 17, communicates by a relatively large return pipe H with a turbine or motor I of any description, which discharges the water or other solution into an iron box K below. This box is connected with a number of pipes L, with one side of the box 7. It may, however, be built integral with the box 7, since the pipes L only make provision for a larger heating surface. The top vessel 17 contains a moisture collector M communicating with a discharge pipe N. The collector M is set up with its lower extremity dipping into the water in the vessel M it being assumed that the level of the water is indicated by the dotted line 19. This prevents the gas from taking the wrong course. The pipe N leads to a condenser 13 of any construction, the drawing showing a simple pipe condenser, the bottom part of which is connected by means of a pipe 16, a pump 14 and a pipe 15 with the bottom compartment 9 of the iron box 7, and by means of a pipe 20 and a pump 21 with the top vessel 17.

T is a pipe with valve 22. This pipe may be employed either for the purpose of filling or emptying the apparatus.

U is a pipe provided with a valve 23. This pipe may be employed for introducing the carbon disulfid or other gas producing medium, into the condenser.

In order to operate this apparatus for the purpose of carrying out my process, I introduce through the pipe T sufficient water or fluid to fill the apparatus up to a level above the bottom of the vessel 17 or to the level indicated by the dotted line 19. Into the condenser 13, I introduce carbon disulfid or another suitable fluid, until it reaches nearly to the pipe 20 or to the level indicated by the dotted line 24. I then allow the heating gases to enter the device 10 through the pipe B, and regulate the heat so as to keep the temperature of the water or other circulating medium below its boiling point, but considerably above that of the gas-producing medium. The test may be made at any time on a sample drawn from the pipe T by opening the valve 22, or at any other suitable place where a pipe and faucet may be provided. When the circulating fluid has reached the proper temperature, I turn on the water to the condenser which enters through a pipe 26 and passes out through a pipe 27. I then start the pump 14 which injects the carbon disulfid or other gas-producing medium, into the bottom compartment 9 of the box 7. The carbon disulfid will here be volatilized, and the gas thus formed forced through the pipes 8 into the larger pipe 6. This will lift the circulating medium into the top tank or vessel 17 filling it up until it can overflow into the protruding pipe H. In passing downwardly through pipe H, the water will start the turbine I. It will then take its way through the box K and the pipes L, back to the box 7, arriving with a certain speed at the openings of the pipes 6. Its speed will be increased by the fresh quantities of gas expelled from the pipes 8, until a certain equilibrium will be reached. The gas escaping from the upper extremities of the pipes 6 into the top vessel 17, passes on through the moisture collector M and pipe N, into the condenser 13 where it is condensed and pumped back into the bottom compartment 9 of the box 7. The small quantities of water or whatever other fluid may be used, which are carried over with the gases and particularly in the case of carbon disulfid, will collect on the surface of the latter. I have provided the extra pipe 20 and pump 21, for use in returning it to the top vessel 17, whenever it shall have accumulated sufficiently for the purpose. In case the gas-producing medium is lighter than the circulating fluid, the latter forms the bottom layer and connections must be changed accordingly.

From the foregoing description my improved process will be readily understood. By means of the burner or heater 10, the water for instance is heated to about 90° C. When this temperature has been reached, the pump 14 is started. The fluid as carbon disulfid being injected into the hot water will then be volatilized and as its boiling point is considerably below 90° C., the vapors formed will exert considerable pressure and overcome the pressure of the column of water. They try to escape and will, as in an air lift pump, carry a certain amount of water upward until it can escape through the connecting pipe H to the turbine which will be started thereby, the water passing to the box K and thence into the box D as heretofore explained. If sufficient heat is supplied to keep up the temperature of the water, it will be obvious that fresh amounts of gas-generating fluid injected by the pump 14, may be converted into gas and so on. The gas expanding in its upward movement with the water, will separate from it at the point where the water can escape into the pipe H, and enter the pipe N whence it passes into the cooler or condenser 13 where it is condensed and again discharged through the agency of the pipe 14 into the compartment 9 of the box 7.

If it be supposed that the fluid which is to furnish the gas, has a much lower latent heat and also a smaller specific heat than water, it will be possible to produce a certain gas pressure at less cost than an equal pressure from water converted into steam, because less fuel will be required for obtaining the same condition. Indeed efforts have been made from time to time to use this principle to an advantage by substituting such other fluid for water in a boiler and engine plant, but considering the unfitness of an engine and apparatus of that kind to be worked by such dangerous substances, all such attempts have turned into failures. The process I have invented, permits work at temperatures and under conditions which will not result in any decomposition of the substances employed; hence no explosions can occur, and as the apparatus employed in carrying out the process has no valves or sliding parts where the gas can escape, there is no danger from poisonous gases.

There are a great many substances which fulfil the conditions required by the process heretofore explained. Those found to be best adapted are carbon bisulfid, ether, the light coal oils, benzin, gasolene, chloroform, alcohol and a considerable number of other organic substances. As a moving fluid, I prefer water or a solution of same heavy substance in water, but any substance fluid at the temperature employed and which is at that temperature not a solvent of the other gas-forming substance, may be substituted for it. The moving fluid ought to be as heavy as possible, as that property will allow the apparatus to be built lower for the same amount of power. The gas formed must easily separate from the fluid after having done its work, hence it should not be soluble in the moving fluid.

It is a known fact that a steam engine plant converts usually only from eight to ten per cent. of the heat contained in the fuel, into useful work. About fifty-three per cent. of all the heat contained in the fuel is lost as latent heat with the exhaust steam. Another large part is lost in the gases escaping from the boiler on account of incrustations, and the high temperature at which they leave the fuel. If, however, carbon disulfid be employed as the gas-forming fluid, the latent heat of which is only about one-sixth of that of water, there will be a waste of only one-sixth of the heat lost in a proportional amount of exhaust steam. Further as the combustion or heat supplying gases leave the apparatus at a temperature below the boiling point of the water or other substance used as a moving fluid, while the temperature of the combustion gases of a steam plant is about 300° C., there is a considerable gain in this respect. Another gain is to be found in the fact of less loss by radiation, this apparatus as has been explained, being set almost totally inside of the heating chamber. There is also less power consumed for pumping water to the condenser.

Having thus described my invention, what I claim is:

1. The herein described power producing process which consists in heating a circulating fluid to a temperature below its boiling point, but above the boiling point of a second fluid, introducing such second fluid into the first fluid whereby the second fluid is transformed into gas or volatilized by the heat of the first fluid, causing the first fluid to acquire velocity and utilizing it separately from the gas of the second fluid to do mechanical work.

2. The process of producing power which consists in heating a circulating medium to a temperature below its boiling point, introducing into this medium a second fluid whose boiling point is sufficiently low, that the second fluid is vaporized by the heat of the first fluid, thus causing the first fluid to acquire velocity which may be utilized to do mechanical work.

3. The herein described power producing process, which consists in heating a circulating liquid to a temperature below its boiling point, but above the boiling point of a second liquid, introducing such second liquid into the first liquid, whereby the second liquid is transformed into gas by the heat of the first liquid, causing the first liquid to be raised by the gas to a higher level, from which it may pass by gravity through a motor and back to its starting point, thus creating mechanical power.

In testimony whereof I affix my signature in presence of two witnesses.

PAUL DANCKWARDT.

Witnesses:
A. J. O'BRIEN,
DENA NELSON.